United States Patent [19]

Barroso

[11] 4,100,716

[45] Jul. 18, 1978

[54] CLAMPING MACHINE

[76] Inventor: Angel Lorenzo Barroso, Ronda Carlos III, s.n., Mataro (Barcelona), Spain

[21] Appl. No.: 651,423

[22] Filed: Jan. 22, 1976

[30] Foreign Application Priority Data

Jan. 24, 1975 [ES] Spain .................................. 209.592[U]

[51] Int. Cl.² ............................................. B65B 51/08
[52] U.S. Cl. .................................. 53/138 A; 29/243.56
[58] Field of Search ..................... 53/138 A, 198 A; 29/243.56, 243.57

[56] References Cited

U.S. PATENT DOCUMENTS

| | | | |
|---|---|---|---|
| 2,681,447 | 6/1954 | Davis | 29/243.57 |
| 3,380,226 | 4/1968 | Tracy | 53/138 A |
| 3,524,242 | 8/1970 | Odean et al. | 29/243.57 |
| 3,783,583 | 1/1974 | Dobbert | 53/138 A |

*Primary Examiner*—Othell M. Simpson
*Assistant Examiner*—John Sipos
*Attorney, Agent, or Firm*—Flehr, Hohbach, Test, Albritton & Herbert

[57] ABSTRACT

A clamping machine for closing sausage casings by means of clamps wherein a movable bar is provided to dislodge the closed clamp from the machine. The bar moves in a passage at a point where it can free the newly closed clamp from the closing die of the machine.

5 Claims, 5 Drawing Figures

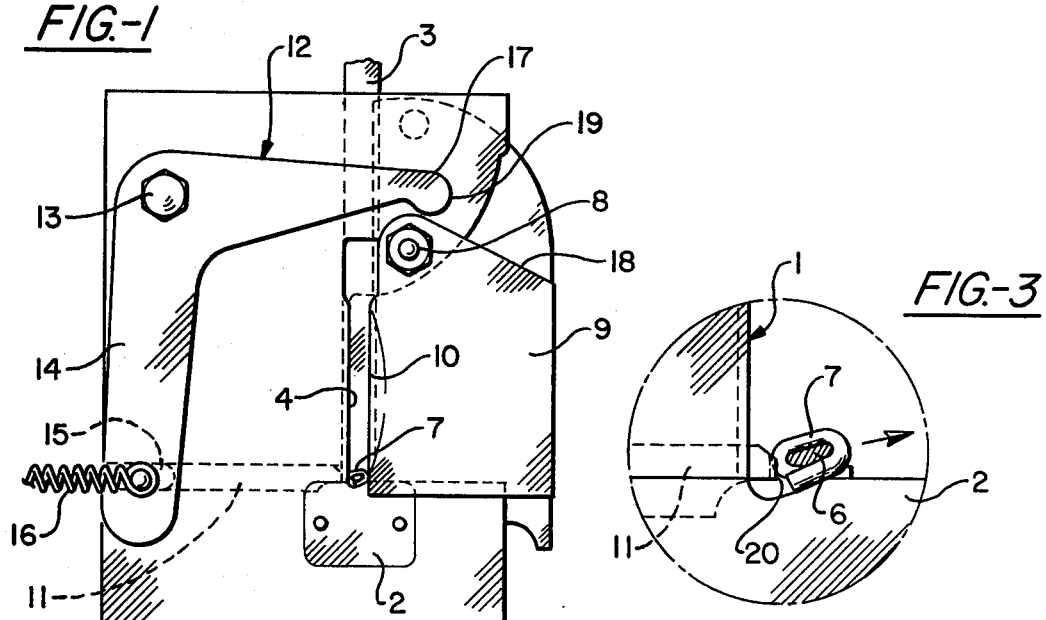
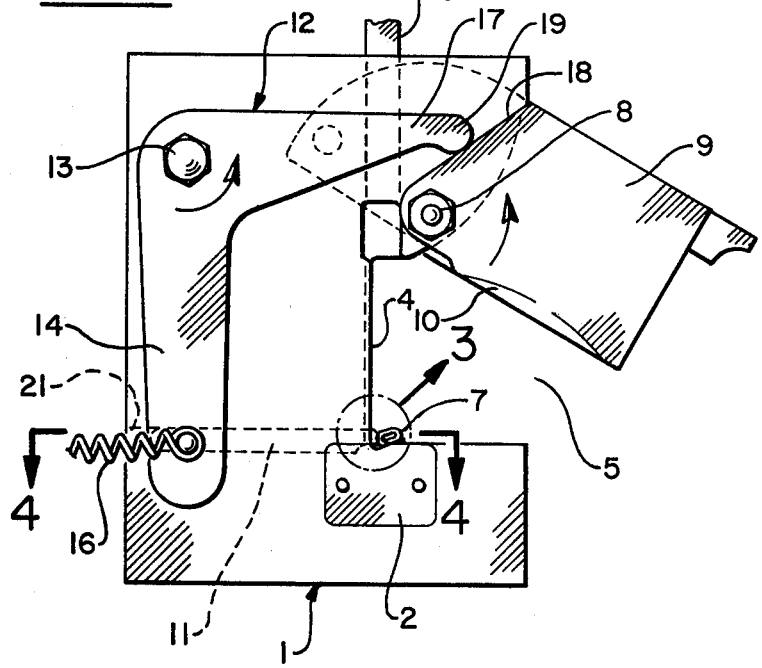

CLAMPING MACHINE

The present invention relates to a clamping machine, particularly applicable to the closing of sausage casings, of the type of those which comprise a frame on which are mounted an actuating device, a device for feeding the clamps by gravity, a clamp-pushing device displaceable in an essentially vertical plane, and a closing die, a vertical support plate provided with grooves for guiding the clamps and the clamp-pushing device, as well as with a lateral opening, being fixed immovably on the frame, communicating with the lower end of said grooves and being adapted to permit the introduction into it of the sausage casing until it lies on the die and the removal of the casing once it is closed by a corresponding clamp, a piece for closing said lateral opening being arranged articulated in rotary fashion around a horizontal pin fixed to the vertical support plate, which is provided on its closing edge with a groove intended to complete the guiding effect of said grooves of the vertical support plate, and said vertical plate also having an orifice which connects the lower mouth of the clamp feeder with the upper part of said guide grooves adapted so that the inverted U-shaped clamps coming from the clamp feeder can enter the guide grooves one by one through it.

This type of clamping machines is well known and used in the sausage industry. More automatically operating facilities in which the clamping machines are in automatic connection with the stuffing machines are used in said industry every day. There are also semi-automatic facilities in which, due to the high production rate of the stuffing machines, the operator who necessarily must introduce the casing into the closing die and remove it once it is clamped, sometimes finds that because of its defective manufacture the clamp jams in the closing die and when the casing is pulled on can cause tearing or breaking of the latter, with the consequent interruption of operation.

The case with the automatically operating facilities referred to is much more serious. In such machines the clamps which are retained in the closing die cause stoppages of the entire operating chain and can even cause significant damage to the clamping machine.

It is an object of the clamping machine of the present application that the aforementioned jamming of the clamps is eliminated completely and the operating rate of the operator in the semi-automatic facilities is improved, he being limited to merely following the sausage instead of removing it from the die.

Said clamping machine of the present application is characterized essentially in that the vertical support plate referred to is provided with a samll bar capable of being displaced longitudinally to itself and in a direction essentially perpendicular to the clamp-pushing device through a passage provided at the interior of the vertical support plate, said passage opening tangentially to the closing die and said small bar being adapted to project, in the opening position of the closing piece, through the mouth of said passage contiguous to the die, in order to push the recently closed clamp, dislodging it from the die.

Other characteristics and advantages of the clamping machine of the present application will be seen from the description given below, in connection with the attached drawings which illustrate, by way of non-limiting example, one form of execution of the clamping machine.

FIG. 1 shows a front elevation of the vertical support plate, with the closing piece in the closing position;

FIG. 2 is a view similar to that of FIG. 1, but with the closing piece in the open position;

FIG. 3 shows a detail, in expanded scale, of the portion circumscribed at 3 of FIG. 2;

FIG. 4 shows a view in cross-section, also in expanded scale, on the line 4—4 of FIG. 2.

Figure 5:
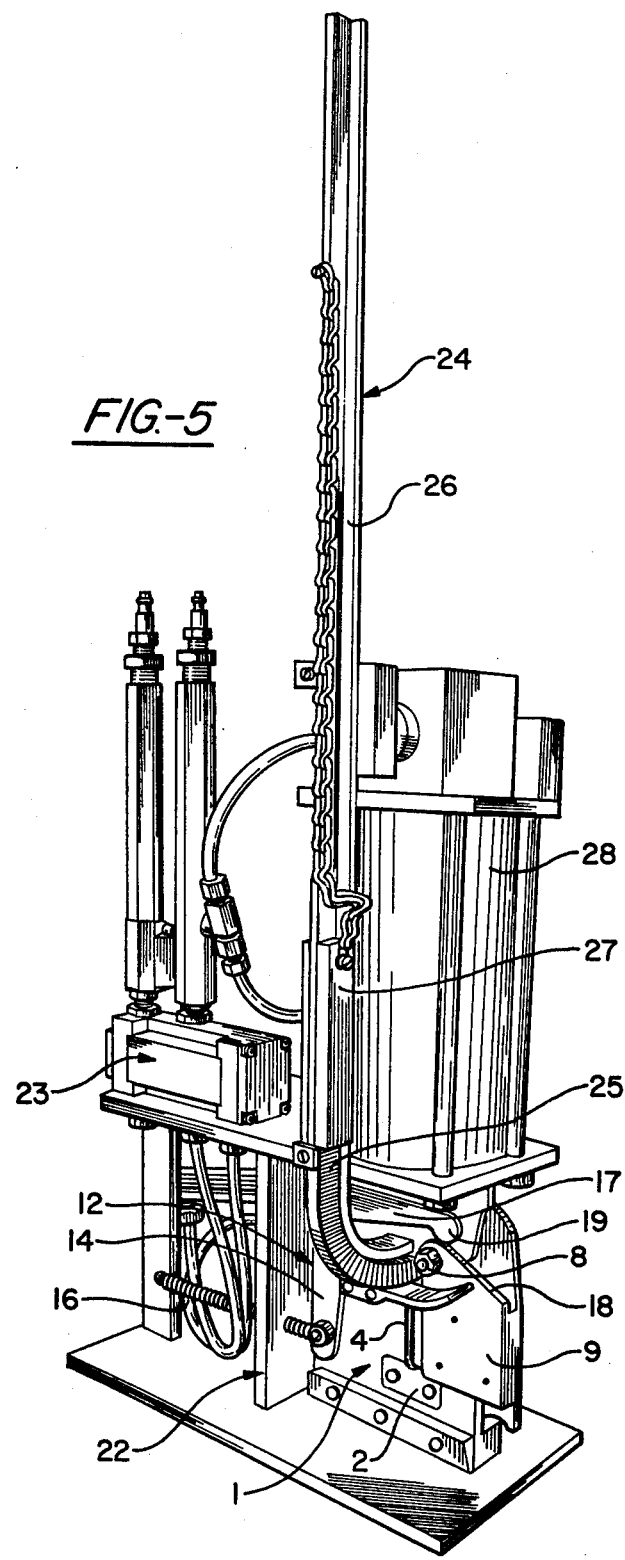
FIG. 5 is a view in perspective of the complete clamping machine.

In said drawings may be seen frame 22; actuating device 23, pneumatic in the case shown; feeder device 24 for clamps 25, provided with a rail 26 for guiding clamps 25 and with a counterweight 27 which presses against them in descending direction; vertical support plate 1; closing die 2; clamp-pushing device 3; air cylinder 28 which acts on pushing device 3; guide grooves 4 of said pushing device 3; lateral opening 5, adapted for introduction of casing 6 and its subsequent removal once clamped with clamp 7; closing piece 9 capable of rotating around pin 8 fixed to plate 1; and groove 10 of piece 9 adpated for the sliding and the guiding of device 3.

Said vertical support plate 1 is provided with a small bar 11 capable of being displaced longitudinally to itself and in a direction essentially perpendicular to the clamp-pushing device 3, through a passage 21 provided at the interior of vertical plate 1, said passage 21 opening tangentially to closing die 2 and said small bar 11 being adapted to project, in the opening position of the closing piece (FIGS. 2, 3, and 4), through the mouth of said passage 21 contiguous to die 2, for the purpose of pushing recently closed clamp 7, dislodging it from die 2.

On one of the external faces of vertical support plate 1 is articulated an angular lever 12, rotating around its corner on a pin 13 perpendicular to vertical support plate 1, one of the arms 14 of said angular lever 12 being connected in articulated fashion with one end of said small bar 11 through an opening 15 provided in the corresponding face of vertical support plate 1. Said arm 14 of angular lever 12 is subjected to the action of a tension spring 16. End 19 of the second arm 17 of angular lever 12 is adapted for contacting upper edge 18 of closing piece 9, in such a way that, when the latter opens, said edge 18 acts on said end 19 of the second arm 17 of angular lever 12, causing the latter to rotate on its articulation, overcoming the action of tension spring 16, with which the first arm 14 pushes on small bar 11 and causes it to project through the mouth of its passage 21 and, upon closing piece 9 closing again for a new clamping cycle, tension spring 16 causes angular level 12 to return to its initial rest position in which small bar 11 is completely concealed in its passage 21 (FIGS. 1 and 5).

The free end of small bar 11 is preferably provided with a concave surface 20 (FIG. 4), which corresponds to the convex surface of a clamp 7, in order to be applied against the latter better.

It is stated that whatever does not alter, change or modify the essential nature of the clamping machine described can be subjected to variations in detail.

What is claimed is:

1. A clamping machine for closing sausage casing by means of a clamp comprising a support plate, means forming an opening in said support plate for the introduction of sausage casing to be clamped, a closing piece capable of rotating on said plate to close said opening for clamping, a clamp pushing device, a closing die including a clamp receiving portion, means forming a passage interior of said support plate with said passage opening into said receiving portion, a bar disposed in said passage, said bar being movable in said passage between a retracted position in which said bar is withdrawn into said passageway and an ejection position in which said bar projects from said passageway into a position for contacting and displacing a recently closed clamp on said die, a lever on said support plate having a pivot and two arms, one arm being connected to said bar and the second arm contacting an edge of said closing piece such that rotation of said closing piece causes said lever to move said bar from said retracted position to said ejection position so as to project from said passage and contact and thereby dislodge a recently closed clamp from said die.

2. A clamping machine as in claim 1 in which said plate is provided with an opening wherein said one arm of said lever is connected in articulated fashion to said bar through said opening in said plate.

3. A clamping machine as in claim 1 wherein said passage opens tangentially to said closing die and said bar is displaceable in a direction essentially perpendicular to said clamp pushing device.

4. A clamping machine as in claim 1 wherein said bar is additionally displaceable so as to be completely concealed in said passage at the initiation of a clamping cycle of said machine.

5. In a clamping machine for closing sausage casing by means of a clamp, said machine having a support plate, means forming an opening in said support plate for the introduction of sausage casing to be clamped, a closing piece capable of rotating on said plate to close said opening for clamping, a clamp pushing device, a closing die, said support plate including means forming a bar support structure on said support plate, a bar supported by said structure, said bar being displaceable tangentially to said die and in a direction essentially perpendicular to said clamp pushing device said bar having one operative position in which the bar directly contacts and pushes against said clamp for displacing the same from said die, a lever on said support plate having a pivot and two arms, one arm being connected to said bar and the second arm contacting an edge of said closing piece such that rotation of said closing piece causes said lever to displace said bar so as to cause the same to dislodge a recently closed clamp from said die.

* * * * *